(12) United States Patent
Ziauddin et al.

(10) Patent No.: US 8,078,402 B2
(45) Date of Patent: Dec. 13, 2011

(54) METHOD OF RANKING GEOMARKERS AND COMPOSITIONAL ALLOCATION OF WELLBORE EFFLUENTS

(75) Inventors: Murtaza Ziauddin, Abu Dhabi (AE); Dalia Abdallah, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 635 days.

(21) Appl. No.: 12/174,002

(22) Filed: Jul. 16, 2008

(65) Prior Publication Data

US 2010/0017130 A1 Jan. 21, 2010

(51) Int. Cl.
*G01V 9/00* (2006.01)
*G06F 1/00* (2006.01)
*G01N 33/00* (2006.01)

(52) U.S. Cl. ... 702/6; 73/152.31; 73/152.37; 166/250.1; 702/100

(58) Field of Classification Search .................. 702/1, 2, 702/6, 7, 9, 11–13, 45, 50, 100; 73/152.37, 73/152.31; 166/250.01, 250.12, 252.1, 252.3
See application file for complete search history.

(56) References Cited

U.S. PATENT DOCUMENTS

| | | | |
|---|---|---|---|
| 4,442,710 | A | 4/1984 | Meng |
| 4,597,290 | A | 7/1986 | Bourdet et al. |
| 4,803,873 | A | 2/1989 | Ehlig-Economides |
| 5,247,829 | A | 9/1993 | Ehlig-Economides |
| 5,602,755 | A | 2/1997 | Ashe et al. |
| 6,944,563 | B2 | 9/2005 | Melbø |
| 7,089,167 | B2 | 8/2006 | Poe |
| 7,658,226 | B2 * | 2/2010 | Ziauddin et al. ......... 166/250.01 |

FOREIGN PATENT DOCUMENTS

WO 2005/075972 A1 8/2005

OTHER PUBLICATIONS

Patent Cooperation Treaty International Search Report, Form PCT/ISA/210, Date of mailing Feb. 3, 2010, pp. 1-3.
Stewart, G., et al., Well Performance Analysis: A Synergetic Approach to Dynamic Reservoir Description, 56th Annual Fall Technical Conference and Exhibition of the Society of Petroleum Engineers of AIME, San Antonio, Texas, Oct. 1981, pp. 1-23, SPE 10209.
Clark, D.G., et al., Analyzing Unstable Flow in Multilayer Wells With an Application of the Inflatable Diverter Flowmeter, Society of Petroleum Engineers, 60th California Regional Meeting, Ventura, California, Apr. 1990, pp. 371-382, SPE 20057.
Da Prat, G., et al., A New Method for Evaluating Layer Productivity Using a Permanent Monitoring System, Society of Petroleum Engineers International Conference and Exhibition, Beijing, China, Nov. 1998, pp. 351-360, SPE 48865.
Jackson, R.R., et al., Advances in Multilayer Reservoir Testing and Analysis using Numerical Well Testing and Reservoir Simulation, Society of Petroleum Engineers Annual Technical Conference and Exhibition, Dallas, Texas, Oct. 2000, pp. 1-14 SPE 62917.

* cited by examiner

*Primary Examiner* — John H Le
(74) *Attorney, Agent, or Firm* — Rachel E. Greene; Jakub Michna; Bridget Laffey

(57) ABSTRACT

A method of method of determining relative contributions of two or more producing subterranean sources to a total flow is described using the steps of selecting a subset from a set of identifiable components in the total flow and using the subset to determine the relative contributions of two or more producing subterranean sources, wherein the subset is selected based on the sensitivity of the determination step to errors in the measurement of concentrations of said identifiable components.

10 Claims, 3 Drawing Sheets

US 8,078,402 B2

METHOD OF RANKING GEOMARKERS AND COMPOSITIONAL ALLOCATION OF WELLBORE EFFLUENTS

FIELD OF THE INVENTION

The invention relates to methods of allocating the relative contributions of two or more producing sources such as subterranean layers in a well or several wells to a total flow based on compositional analysis or compositional fingerprinting.

BACKGROUND

In hydrocarbon exploration and production there is a need to determine the approximate composition of oil samples in order to investigate their origin and properties. The production system of a developed hydrocarbon reservoir typically includes pipelines which combine the flow of several sources. These sources can be for example several wells or several producing zones within a single well. It is a challenge in the oilfield industry to back allocate the contributions of each source from a downstream point of measurement at which the flow is already commingled.

It is known to analyze oil samples to determine the approximate composition thereof and, more particularly, to obtain a pattern that reflects the composition of a sample known in the art as fingerprinting. Such geochemical fingerprinting techniques have been used for allocating commingled production from multilayered reservoirs.

There are many known methods of fingerprinting. Most of these methods are based on using a physicochemical method such as gas chromatography (GC), mass spectroscopy or nuclear magnetic resonance or others to identify individual components of a complex hydrocarbon mixture and their relative mass. In some known applications, a combination of gas chromatography and mass spectroscopy (GC-MS) is used to detect spectra characteristic of individual components of the complex hydrocarbon mixture.

Most fingerprinting techniques known in the art are based on the identification and quantification of a limited number of selected components which act as marker molecules. One such method is described in U.S. Pat. No. 5,602,755A to Ashe et al., and in the published international patent application WO 2005075972. Further methods of using compositional analysis for the purpose of back allocating well production is described for example in the U.S. Pat. No. 6,944,563 to Melbø et al.

Typically the produced fluids, if composed of reservoir effluent, such as mixtures of oil, gas and water contain many different chemical components or molecular species. Thus the number of potential geomarkers may range from several hundreds to thousands. However, among those there are often some markers which provide better accuracy in allocating production than others.

In the field of well testing it has been long known to measure the inflow performance relationship (IPR) between production or flow rate and the downhole pressure. A method of using the IPR to optimize production is for example demonstrated in the U.S. Pat. No. 4,442,710 to Meng. Its use for investigating multilayered reservoirs is for example described in the U.S. Pat. No. 4,803,873 to Ehlig-Economides. The measurement of flow rates and pressures from multilayered reservoirs is also described in the more recent co-owned U.S. Pat. No. 7,089,167 to Poe. Other known methods of determining IPRs and their use in multilayered reservoirs are presented in the Society of Petroleum Engineers (SPE) papers no. 10209, 20057, 48865 and 62917.

In the light of the known methods it is seen as an object of the present invention to provide a method of ranking components in commingled flow, in particular such that markers that could provide the most accurate measurement for back allocating flow are identified.

SUMMARY OF INVENTION

According to a first aspect, this invention relates to a method of determining relative contributions of two or more producing subterranean sources to a total flow. The method includes the steps of selecting a subset from a set of identifiable components in the total flow and using the subset to determine the relative contributions of two or more producing subterranean sources, wherein the subset is selected based on the sensitivity of the determination step to errors in the measurement of concentrations of said identifiable components.

In a preferred embodiment of the invention, the sensitivity is determined using a relation linking changes in the flow of one source to the changes of flow in the remaining sources such as the inflow pressure relationship (IPR) or any other relation which links two flows from individual sources in a deterministic manner for any pair of sources.

In a preferred embodiment of the invention, a relation linking changes in the flow of one source to the changes of flow in the remaining sources is used to determine the change of the concentration of one of the identifiable components in response to a change in the flow from said one source using for example the total mass balance for a component.

In a preferred embodiment of the invention, the relative contributions of two or more producing subterranean sources are determined using mass balance, preferably as an overdetermined system of mass balance equations for the individual components of the total flow. In a variant of this embodiment, prior knowledge of concentrations of components in flow of individual sources as gained for example from testing the individual sources using downhole testing or sampling devices is applied.

In a further preferred embodiment of the invention, the concentrations are determined using spectroscopic or chromatographic methods.

These and other aspects of the invention are described in greater detail below making reference to the following drawings.

DETAILED DESCRIPTION

Figure 1:
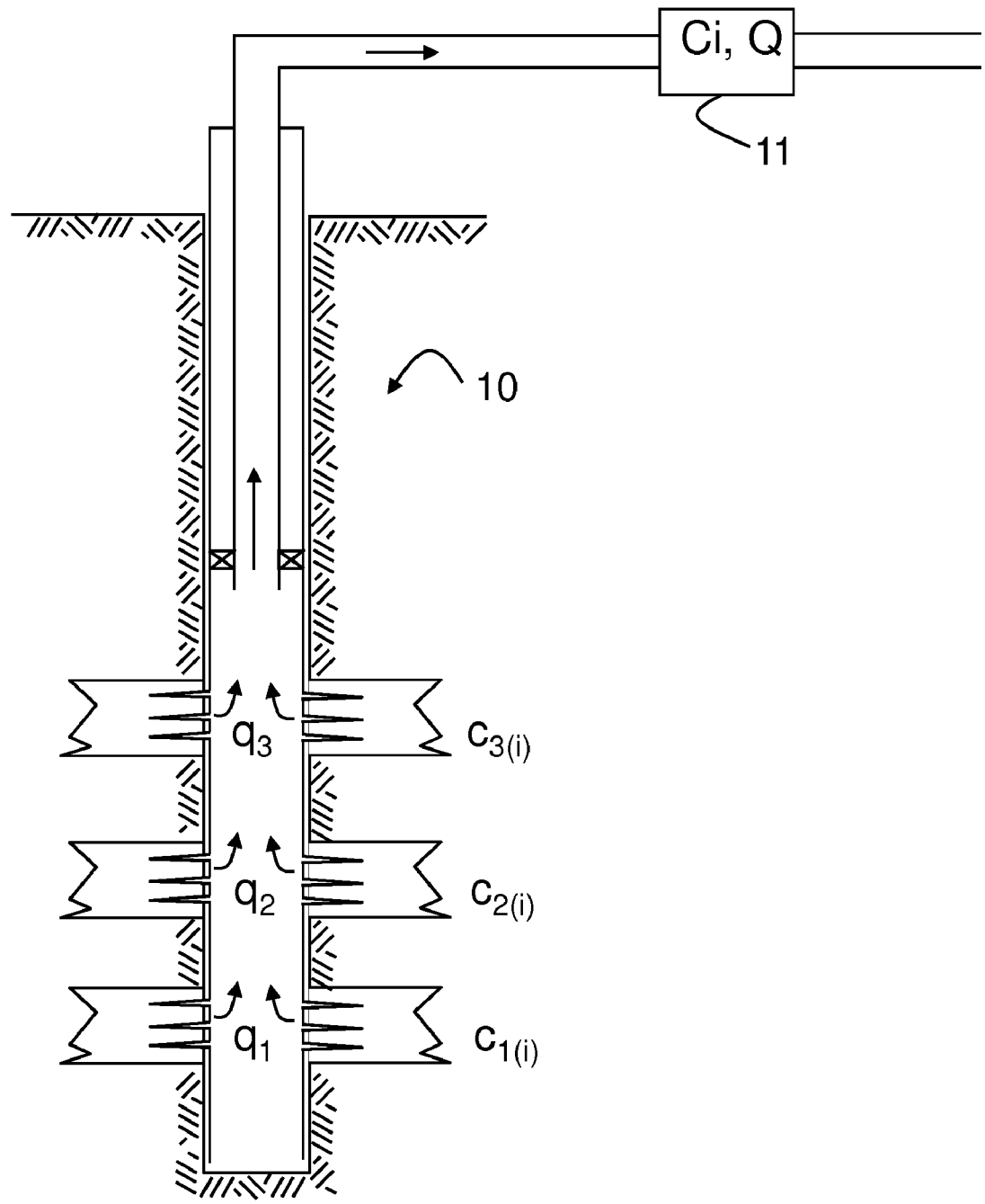
FIG. 1 illustrates an example of a multilayered reservoir.

The method is illustrated by the following example, in which FIG. 1 shows an oil well 10 drilled in a formation containing several oil-bearing layers. In this example the number of separate layers is chosen to be three to allow for a clearer description of elements of the present invention. However, the number of layers can vary and the below described example is independent of any specific number of layer. In the example, there is assigned to each layer a flow rate q1, q2, and q3, respectively. The fluids produced of the three layers contain chemical components at concentrations $c1(i)$, $c2(i)$ and $c3(i)$, respectively, wherein the index number i denotes a component i in the fluid. The number of components can vary greatly and may go beyond 1000 depending on the nature of the fluids in the layers.

The concentrations $c1(i)$, $c2(i)$ and $c3(i)$, can be determined using commercially available formation testing or sampling tools and methods, such as Schlumberger's MDT™. Samples taken from one of the layers using a formation sampling tool can be either analyzed directly downhole or stored in a sample bottle for analysis in a surface laboratory.

Under normal production conditions, the combined flow is produced using subsurface and surface production facilities as shown in the figure. On the surface, there is shown a device 11 to measure the flow rate Q of the combined flow and the combined or total concentration C(i) of component i. Though shown in the schematic drawing as one device, the measurements of Q and C(i) may be taken at different locations and even different times (provided the flow conditions are sufficiently stable). The flow rates can be measured using any of the commercially available flowmeters such as Schlumberger's PhaseWatcher™. The flowmeter can be stationary or mobile.

The concentration measurements can be performed in situ or by taking samples for subsequent analysis in a laboratory. The concentration measurement itself can be based on optical, IR or mass spectroscopic, chromatographic or any other known method which is capable of discriminating between species and their respective amounts in the produced fluids.

Figure 2:
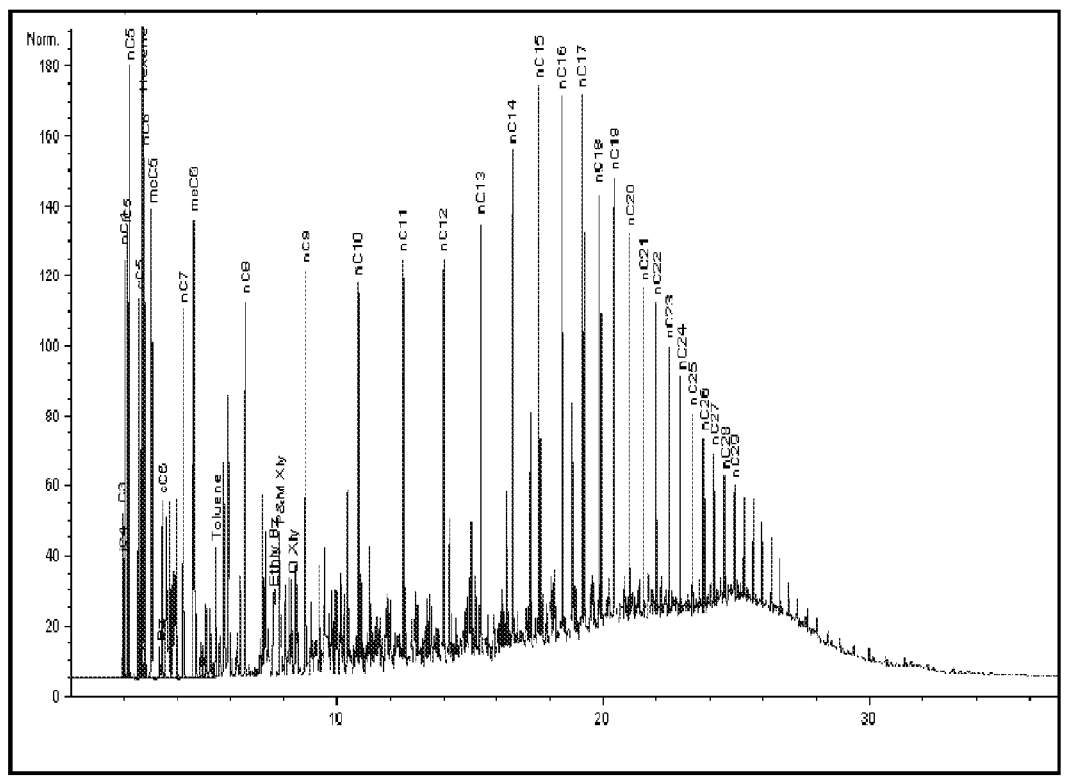
FIG. 2 is a gas chromatogram of a flow sample to illustrate the large number of possible geomarkers in a typical oil sample.

Using for example GC, a typical result of the analysis of a fluid sample is shown in FIG. 2. FIG. 2 shows the concentration of species according to their respective molecular weights. Whilst the details of the graph of figure should be treated as an example only, it is clear that in typical wells a large number of different components are present in the produced fluid, many of which could potentially serve as geomarkers to determine its source.

Before describing in detail steps to determine which of the components of the fluid are useful geomarkers, the basic equations which govern the transport of mass from the well are presented. Using the notation as presented in FIG. 1, these are:

$$\text{Mole/Mass balance: } q_1 c_{1i} + q_2 c_{2i} + q_3 c_{3i} = QC_{(i)} \quad [1]$$

and $$\text{Mass conservation: } q_1 + q_2 + q_3 = Q. \quad [2]$$

Again it should be emphasized that the above equation [1] applies to any component i of the produced fluid and that equations [1] and [2] can be readily extended to any number of sources by adding the respective flow rates.

In the present example the total flow rate Q and each of the total concentration C(i) of a component i are measured at the surface. The concentrations of the component i in the respective layers $c1(i)$, $c2(i)$ and $c3(i)$, is taken to be a constant and the values as measured by the formation testers are applied. To solve the equations [1] and [2] for the flow rates, two of the unknown flow rates q1, q2, and q3 have to be found. The third can be derived from equation [2]. Thus in principle a solution can be found using just two components in the flow as geomarkers using standard methods for solving a set of linear equations.

In a general case of n sources, there are n−1 unknown flow rates. In such case, n−1 geomarkers can be used to determine all unknown flow rates.

The solution based on equations [1] and [2] though in principle valid, causes in practice significant problems. A first of such problems is related to the correct selection of a geomarker given the multitude of components present in the fluid. In an ideal example, components would be identifiable which are (a) present in only one layer and (b) readily and accurately measurable from the surface. The existence of such components would make the determination of the unknown flow rates a straight forward task. As however these conditions are rarely met in any real environment, the present invention includes a method of selecting relevant geomarkers to be described in detail below.

In the present example, the selection of a geomarker uses a sensitivity function which provides a relationship between variations of a local flow rate q of a source and the corresponding variations of the total concentration C(i) of a component i. Following the present example, this function can be derived from inflow performance relationships (IPR), the principles of which are described in the above cited '710 or '873 patents. These and other sources such as the SPE papers 10209, 20057, 48865 and 62917 include information on establishing IPRs for a multi-layer reservoir.

Figure 3:
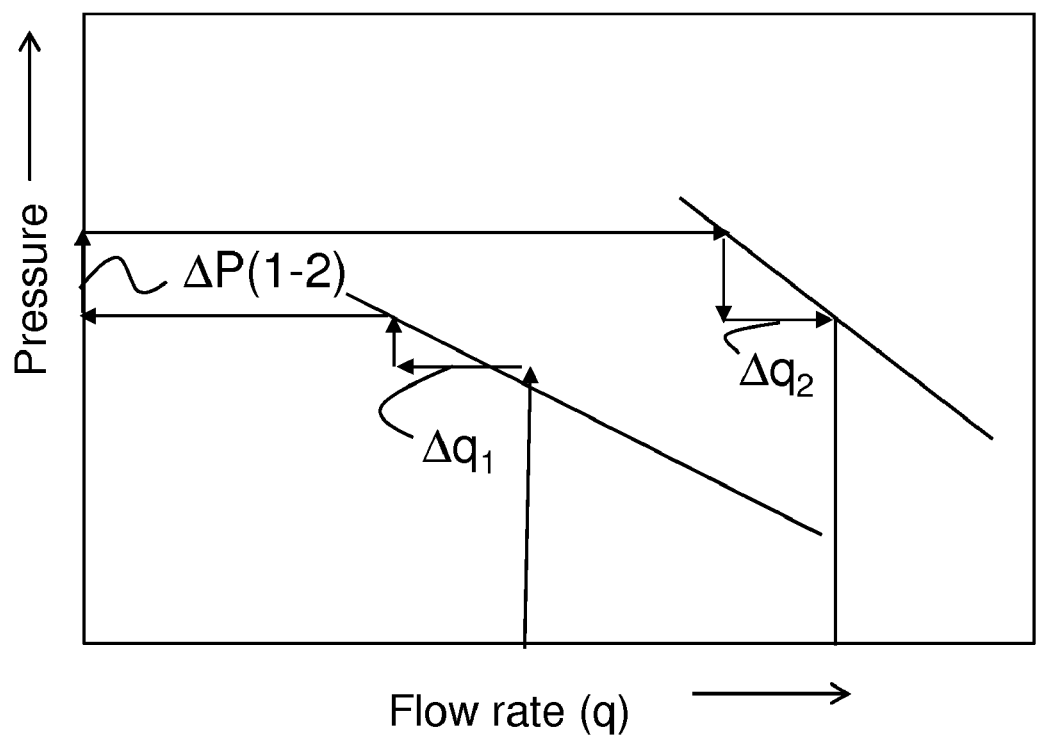
FIG. 3 shows inflow performance relations (IPRs) for two different layers in a well.

The inflow performance relationships when applied to the example can be presented as shown in FIG. 3. In FIG. 3 IPRs for the two layers which produce the flows q1 and q2 can be presented as a set of two curves P(q1) and P(q2) or, if approximated linearly, as two straight lines such as shown.

The IPR is then used to link changes or variation in the flow rate at one layer to a change in pressure which in turn can be used to determine the pressure at the location of another layer or source. Under simplifying assumptions, the difference between the pressure at one location and another is determined by the difference in hydrostatic pressure between the two locations.

Hence, the IPR P(q1) can be used to translate a variation $\Delta q1$ of an initial value to a change in pressure according to the value P(q10+$\Delta$q1). Adding the hydrostatic pressure $\Delta$P(1-2) between the location of the first and second layer to the value P(q10+$\Delta$q1) yields the new pressure P(q10+$\Delta$q1)+$\Delta$P(1-2) at the location of the second layer. Applying the second IPR P(q2) for a pressure P(q10+$\Delta$q1)+$\Delta$P(1-2) results in a shift of the flow rate q2 from the initial q20 by an amount of $\Delta$q2.

The example as described is illustrated by the path of arrows in FIG. 3. It should be noted that the method applies to any pair of IPRs, hence the change of flow rates of layers following a variation of the flow rate in one of them can be determined for any number or layers.

Whilst the above example assumes that the sole cause of a pressure difference between layers is caused by the difference in the hydrostatic pressure, it can be extended to include further sources which influence the pressure difference such as friction losses etc.

Using the above method to calculate the change in all flow rates, equation [1] can be used to determine the corresponding change in the total concentration C of the component i in question. By combining the above steps, multi-layer or multi-source inflow pressure relations can be used to determine the sensitivity of the concentration of a component with respect to a variation in the flow rate and vice versa.

It is worth noting that the inflow pressure relations used above can be replaced by any other relation that links the flow rates and their respective changes which is independent of the actual mass balance equations [1] and [2]. For example a temperature dependence of the flow rate combined with a known gradient of the temperature gradient between the layers can be used in a similar way as the pressure.

Once the sensitivity of a concentration of a component i to variations of the local flow rates is known, a selected maximum value in the error of a local flow rate can be transformed into a corresponding error of the concentration of a component. Defining for example the maximum allowable error in a flow rate as $\Delta q(max)$ the corresponding fluctuation of component i defines a $\Delta Ci(max)$, which is then taken as the limit for the tolerable error in the measurement of the concentration of a useful geomarker.

To identify useful geomarkers, $\Delta Ci(max)$ is compared to the actual error $\Delta Ci(actual)$ in the measurement of Ci. The actual error of the measurement is derived using standard methods of determining or estimating errors in measurements. For example, it can be determined by experience, by given accuracy of the measurement tool or by analyzing repeated measurements.

Then for each geomarker the ratio $\Delta Ci(actual)/Ci(max)$ is determined. If $\Delta Ci(actual)/Ci(max)<1$, a component is deemed to be an acceptable geomarker for the present example. If $\Delta Ci(actual)/Ci(max)>1$, it is deemed not acceptable. However, it should be noted that the exact definition and cut-off value of the selection criterion is very much a subject of choice to be made by the operator.

Using the selection criterion, the geomarkers can also be ranked in accordance with their respective value, i.e. in this example their respective value $\Delta Ci(actual)/Ci(max)$.

As stated above, the two top ranking geomarkers as identified using the above methods would theoretically suffice to solve the system of linear equations [1] and [2]. However in many cases it is seen as advantageous to further improve the method by using an over-determined system of equations [1]. A solution can then be found by applying, for example, the least-square method with a solution which minimizes the error in the concentrations as calculated using equation [1] and as measured by:

$$\min\|Ci(calc)-Ci(measured)\|. \quad [3]$$

The above described method based on equation [3] can be replaced by any other method to achieve a similar minimization of the error. Such other methods include using the sum of the normalized square of the error, e.g., SUM (((Ci(calc)−Ci(measured))/Ci(measured))**2) or SUM (ABS((Ci(calc)−Ci(measured))/Ci(measured))).

The ranking of geomarkers as established through the application of the present invention can also be made part of a larger process. In such a larger process, the ranking may serve as an initial or intermediate ranking to be refined in later steps using other methods. It is similarly possible to select a subset of identifiable components using a "hybrid" method where other selection criteria or methods are combined with the sensitivity of the determination step to errors in the measurement of concentrations of the identifiable components in the selection process. Because of this, all references in this application to "selecting a subset of identifiable components based on the sensitivity of the determination step to errors in the measurement of concentrations of the identifiable components" should be understood as meaning "selecting a subset of identifiable components based at least in part on the sensitivity of the determination step to errors in the measurement of concentrations of the identifiable components", in addition to "selecting a subset of identifiable components based solely on the sensitivity of the determination step to errors in the measurement of concentrations of the identifiable components".

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A method of determining relative contributions of two or more producing subterranean sources to a total flow, the method comprising providing a processor to conduct the steps of:
   selecting a subset from a set of identifiable components in the total flow; and
   using said subset to determine said relative contributions of two or more producing subterranean sources;
   wherein said subset is selected based on a sensitivity of the determination step to errors in a measurement of concentrations of said identifiable components.

2. The method in accordance with claim 1, wherein the sensitivity is determined using a relation linking changes in the flow of one subterranean source to the changes of flow in the remaining subterranean sources.

3. The method in accordance with claim 2, wherein the relation linking changes in the flow of one subterranean source to the changes of flow in the remaining subterranean sources is used to determine the change of the concentration of one of said identifiable components in response to a change in the flow from said one subterranean source.

4. The method in accordance with claim 2, wherein the relation linking changes in the flow of one subterranean source to the changes of flow in the remaining subterranean sources is a relation between pressure related parameters and flowrate related parameters.

5. The method in accordance with claim 1, wherein the relative contributions of two or more producing subterranean sources are determined using mass balance.

6. The method in accordance with claim 1, wherein the relative contributions of two or more producing subterranean sources are determined using an overdetermined system of mass balance equations.

7. The method in accordance with claim 1, wherein the relative contributions of two or more producing subterranean sources are determined using prior knowledge of concentrations of components in flow of individual sources.

8. The method in accordance with claim 1, wherein the relative contributions of two or more producing subterranean sources are determined using prior knowledge of concentrations of components in flow of individual sources, wherein said prior knowledge is derived from formation testing or sampling of said individual sources.

9. The method in accordance with claim 1, wherein the concentration of a component is determined using spectroscopic or chromatographic methods.

10. The method in accordance with claim 1, wherein the selected subset is applied as initial or intermediate result in process to further refine the selection of relevant components.

* * * * *